United States Patent
Choi et al.

(10) Patent No.: US 12,556,911 B2
(45) Date of Patent: Feb. 17, 2026

(54) ADHOC GROUP CALL IN WIRELESS COMMUNICATION SYSTEM

(71) Applicant: SAMSUNG ELECTRONICS CO., LTD., Suwon-si (KR)

(72) Inventors: Hongjin Choi, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 18/324,908

(22) Filed: May 26, 2023

(65) Prior Publication Data

US 2023/0388789 A1 Nov. 30, 2023

(30) Foreign Application Priority Data

May 27, 2022 (KR) .................. 10-2022-0065089
Oct. 18, 2022 (KR) .................. 10-2022-0134340

(51) Int. Cl.
*H04W 12/041* (2021.01)
*H04W 12/069* (2021.01)
(Continued)

(52) U.S. Cl.
CPC ....... *H04W 12/041* (2021.01); *H04W 12/069* (2021.01); *H04W 76/12* (2018.02);
(Continued)

(58) Field of Classification Search
CPC ......... H04W 4/06–10; H04W 4/30–80; H04W 84/10–22
See application file for complete search history.

(56) References Cited

U.S. PATENT DOCUMENTS

| | | | |
|---|---|---|---|
| 8,452,014 B2 * | 5/2013 | Ratliff | H04L 9/0833 380/278 |
| 2007/0197250 A1 | 8/2007 | Kies et al. | |

(Continued)

OTHER PUBLICATIONS

3GPP TS 23.379 V18.1.0 (Mar. 2022); Technical Specification; 3rd Generation Partnership Project; Technical Specification Group Services and System Aspects; Functional architecture and information flows to support Mission Critical Push To Talk (MCPTT); Stage 2; (Release 18); 246 pages.

(Continued)

*Primary Examiner* — San Htun

(57) ABSTRACT

The disclosure relates to a 5G or 6G communication system for supporting a higher data transmission rate. A method of a first terminal in a wireless communication system is provided. The method comprising: generating an AGK for an adhoc group; transmitting an adhoc group communication request message including a list including IDs of a plurality of second terminals included in the adhoc group and connected to the first server; receiving an adhoc group communication return message signed by the first server; performing an encryption and signing operation on the AGK based on first authentication information related to the first terminal and the second authentication information; transmitting an adhoc group communication security material request message including the AGK that is encrypted and signed; receiving an adhoc group communication response message in response to transmitting the adhoc group communication security material request message; and performing a secure communication.

22 Claims, 12 Drawing Sheets

(51) Int. Cl.
  *H04W 76/12* (2018.01)
  *H04W 76/14* (2018.01)
  *H04W 84/18* (2009.01)
  *H04W 4/10* (2009.01)
  *H04W 4/70* (2018.01)
  *H04W 76/45* (2018.01)
  *H04W 92/18* (2009.01)

(52) U.S. Cl.
  CPC ........... *H04W 76/14* (2018.02); *H04W 84/18* (2013.01); *H04W 4/10* (2013.01); *H04W 4/70* (2018.02); *H04W 76/45* (2018.02); *H04W 92/18* (2013.01)

(56) References Cited

U.S. PATENT DOCUMENTS

| | | | | |
|---|---|---|---|---|
| 2009/0086973 | A1* | 4/2009 | Buddhikot | H04L 63/062 380/273 |
| 2015/0350006 | A1* | 12/2015 | Bhargava | H04L 41/28 709/202 |
| 2016/0218865 | A1* | 7/2016 | Patil | H04L 63/062 |
| 2019/0387401 | A1* | 12/2019 | Liao | H04W 4/08 |
| 2020/0037119 | A1 | 1/2020 | Yang et al. | |
| 2020/0153806 | A1* | 5/2020 | Zhang | H04W 12/03 |
| 2020/0235929 | A1* | 7/2020 | Jacobs | H04L 9/3073 |
| 2020/0252758 | A1 | 8/2020 | Gan et al. | |
| 2021/0392468 | A1 | 12/2021 | Gundur et al. | |

OTHER PUBLICATIONS

3GPP TS 23.280 V18.1.0 (Mar. 2022) Technical Specification; 3rd Generation Partnership Project; Technical Specification Group Services and System Aspects; Common functional architecture to support mission critical services; Stage 2 (Release 18); 299 pages.
International Search Report and Written Opinion of the International Searching Authority dated Aug. 21, 2023, in connection with International Application No. PCT/KR2023/007249, 8 pages.
3GPP TR 23.700-76 V0.2.0 (Apr. 2022), Technical Report, 3rd Generation Partnership Project; Technical Specification Group Services and System Aspects; Study on Ad hoc Group Communication support for Mission Critical Services; (Release 18), Apr. 2022, 28 pages.
3GPP TS 33.180 V17.6.0 (Mar. 2022), Technical Specification, 3rd Generation Partnership Project; Technical Specification Group Services and System Aspects; Security of the Mission Critical (MC) service; (Release 17), Mar. 2022, 204 pages.

\* cited by examiner

ADHOC GROUP CALL IN WIRELESS COMMUNICATION SYSTEM

CROSS REFERENCE TO RELATED APPLICATIONS

The present application claims priority to Korean Patent Application Nos. 10-2022-0065089, filed May 27, 2022, and 10-2022-0134340, filed Oct. 18, 2022, the entire contents of which is incorporated herein for all purposes by this reference.

BACKGROUND

1. Field

The disclosure relates to a wireless communication system, and more particularly, to a method and apparatus for supporting security between terminals of an adhoc group in a disaster safety communication network.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile Broadband (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML). AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

In an adhoc group call arbitrarily established between terminals, in the case that security information of another terminal is not stored in the terminal generating the adhoc group call, the disclosure is to provide a method and apparatus for receiving security information of the other terminal from a MCX (mission critical push-to-talk (MCPTT). MCData, MCVideo) server and supporting security for the adhoc group call.

A method for operating a first terminal connected to a first server in a wireless communication system according to the disclosure comprises generating an adhoc group key (AGK) for an adhoc group; transmitting to the first server an adhoc group communication request message including a list including identifications (IDs) of a plurality of second terminals included in the adhoc group and connected to the first server; receiving an adhoc group communication return message signed by the first server and including second authentication information related to the plurality of second terminals as a response to the adhoc group communication request message from the first server; performing encryption and signing on the AGK based on pre-stored first authentication information related to the first terminal and the second authentication information; transmitting an adhoc group communication security material request message including the encrypted and signed AGK to the first server; receiving an adhoc group communication response message as a response to the adhoc group communication security material request message from the first server; and performing secure communication with the plurality of second terminals based on the adhoc group communication response message.

The list may indicate an ID of a terminal corresponding to the first authentication information among the plurality of second terminals and an ID of a terminal not corresponding to the first authentication information among the plurality of second terminals.

The second authentication information may include a certificate of a first key management (KM) server connected to the first server.

The second authentication information may include at least one of a Sakai-Kasahara key encryption (SAKKE) public key and server ID of a first KM server connected to the first server.

The list may include IDs of a plurality of third terminals included in the adhoc group and connected to a second server.

The list may indicate an ID of a terminal corresponding to the first authentication information among the plurality of third terminals and an ID of a terminal not corresponding to the first authentication information among the plurality of third terminals.

The adhoc group communication return message may include third authentication information related to the terminal that does not correspond to the first authentication information among the plurality of third terminals.

The third authentication information may include a certificate of a second KM server connected to the second server.

The third authentication information may include at least one of a SAKKE public key and server ID of a first KM server connected to the second server.

The AGK may be encrypted and signed based on the first authentication information, the second authentication information, and the third authentication information, The secure communication may be performed with the plurality of second terminals and the plurality of third terminals.

A method for operating a first server in a wireless communication system according to the disclosure comprises receiving, from a first terminal, an adhoc group communication request message including a list including identifications (IDs) of a plurality of second terminals included in an adhoc group and connected to the first server; transmitting a certificate request message requesting second authentication information related to the plurality of second terminals to a first key management (KM) server connected to the first server based on the adhoc group communication request message; receiving a certificate response message including the second authentication information from the first KM server as a response to the certificate request message; performing a signature on the second authentication information based on the certificate response message; transmitting an adhoc group communication return message including the signed second authentication information to the first terminal; receiving an encrypted and signed AGK from the first terminal in response to the adhoc group communication return message; transmitting an adhoc group communication request message including the encrypted and signed AGK and the first authentication information to the plurality of second terminals; receiving an adhoc group communication response message from the plurality of second terminals as a response to the adhoc group communication request message; transmitting the adhoc group communication response message to the first terminal; and performing secure communication with the first terminal and the plurality of second terminals based on the adhoc group communication response message. The list may indicate an ID of a terminal corresponding to the first authentication information among the plurality of second terminals and an ID of a terminal not corresponding to the first authentication information among the plurality of second terminals.

The second authentication information may include a certificate of a first key management (KM) server connected to the first server.

The second authentication information may include at least one of a SAKKE public key and server ID of a first KM server connected to the first server.

The list may include IDs of a plurality of third terminals included in the adhoc group and connected to a second server.

The list may indicate an ID of a terminal corresponding to the first authentication information among the plurality of third terminals and an ID of a terminal not corresponding to the first authentication information among the plurality of third terminals.

The method for operating the first server may comprise transmitting a certificate request message requesting third authentication information related to the plurality of third terminals to a second KM server connected to the second server based on the adhoc group communication request message; receiving a certificate response message including the third authentication information from the second KM server as a response to the certificate request message; and performing a signature on the third authentication information based on the certificate response message.

The adhoc group communication return message may include the third authentication information, The third authentication information may include a certificate of a third KM server connected to the second server.

The third authentication information may include at least one of a SAKKE public key and server ID of a third KM server connected to the second server.

The first authentication information may be a first certificate of the first KM server.

The first authentication information may include at least one of an elliptic curve-based certificate less signatures for identity-based encryption (ECCSI) public key and server ID of the first KM server.

According to the disclosure, in the adhoc group call arbitrarily established between terminals, in the case that security information of another terminal is not stored in the terminal generating the adhoc group call, security information of the other terminal is received from a mobility service (MCX) server, so that the security for the ad hoc group call can be supported.

Before undertaking the DETAILED DESCRIPTION below, it may be advantageous to set forth definitions of certain words and phrases used throughout this patent document: the terms "include" and "comprise," as well as derivatives thereof, mean inclusion without limitation, the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
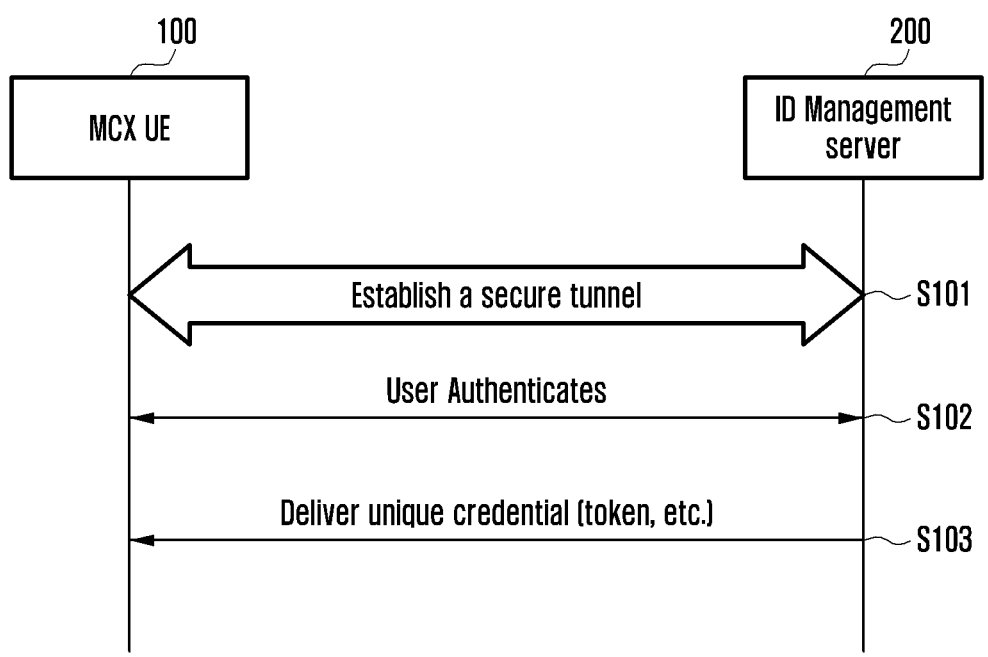
FIG. 1 illustrates a wireless communication system supporting a disaster safety communication network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments are described in detail with reference to the accompanying drawings. In the drawings, the same reference numerals denote the same elements. Well known functions or structures may not be described or illustrated in detail to avoid obscuring the subject matter of the disclosure.

In the accompanying drawings, some components may be exaggerated, omitted, or schematically illustrated. Further, the size of each component does not entirely reflect the actual size. In the drawings, identical or corresponding components may be provided with identical or similar reference numerals.

Various advantages and features of the disclosure and ways to achieve them will be apparent by making reference to embodiments as described below, in conjunction with the accompanying drawings. However, the disclosure is not limited to the embodiments set forth below, but may be implemented in various different forms. The following embodiments are provided only to inform those skilled in the art the scope of the disclosure, with the present disclosure being defined by the appended claims.

Each block of the flowchart illustrations, and combinations of blocks in the flowchart illustrations, can be implemented by computer program instructions, which may be mounted on a processor of a general purpose computer, a special purpose computer or other programmable data processing apparatus so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Further, each block may represent a portion of a module, a segment or code, which includes one or more executable instructions for implementing a specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

The term unit means software or a hardware component, such as a field programmable gate array (FPGA) or an application-specific integrated circuit (ASIC), and the unit performs specific tasks. However, the unit does not always have a meaning limited to software or hardware. The unit may advantageously be configured to reside on an addressable storage medium and configured to operate on one or more processors. Accordingly, the unit may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and units may be combined into fewer components and units or may be further separated into additional components and units.

Further, the components and units may be implemented to operate on one or more central processing units (CPUs) within a device or a security multimedia card. Hereinafter, a base station is the subject of resource assignment to a terminal, and may be at least one of an eNode B (eNB), a Node B, a base station (BS), a radio access network (RAN), an access network (AN), an RAN node, a NR NB, a gNB, a wireless access unit, a base station controller and a node in a network. Also, the base station may be a network entity including at least one of an integrated access and backhaul-donor (IAB-donor), which is a gNB providing network access to UE(s) through a network of backhaul and access links in the NR system, and an IAB-node, which is a radio access network (RAN) node supporting NR backhaul links to the IAB-donor or another IAB-node and supporting NR access links to UEs. The UE is wirelessly connected through the IAB-node and may transmit/receive data to and from the TAB-donor connected with at least one IAB-node through the backhaul link. The user equipment (UE) may include a terminal, a mobile station (MS), a cellular phone, a smartphone, a computer, or a multimedia system capable of performing communication functions.

In the disclosure, downlink (DL) means the radio transmission path of a signal transmitted from a BS to a UE, and uplink (UL) means the radio transmission path of a signal transmitted from a UE to a BS. Further, although LTE- or LTE-A-based system is described in connection with embodiments, as an example, embodiments may also apply to other communication systems with similar technical background or channel form. Further, embodiments may be modified in such a range as not to significantly depart from the scope of the disclosure under the determination by one of ordinary skill in the art and such modifications may be applicable to other communication systems.

The description of embodiments of the disclosure is made mainly based on a new radio (NR) access network (new RAN) and packet core (a 5th generation (5G) system, a 5G core network, or a next generation (NG) core) which is a core network on the 5G mobile communication standard specified by the 3rd generation partnership project (3GPP), which is a mobile communication standardization group, but the main subject of the disclosure can be applied to other communication systems having a similar technical background with slight modification without departing from the scope of the disclosure, which can be determined by those skilled in the art.

For ease of description, some of the terms or names defined in the 3rd generation partnership project (3GPP) standards (standards for 5G, new radio (NR), long-term evolution (LTE), or similar systems) may be used. However, the disclosure is not limited by such terms and names and may be likewise applicable to systems conforming to other standards. In addition, the disclosure may be applied to a wireless communication system supporting network slice (or network slicing).

The 5G system supports network slices, and traffic for different network slices may be processed by different protocol data unit (PDU) sessions. The PDU session may mean an association between a data network providing a PDU connection service and a UE. The network slice may be understood as a technique of logically constituting a network with a set of network functions (NFs) to support various services with different characteristics, such as broadband communication services, massive IoT, mission critical services such as V2X, and separating different network slices. Therefore, even when a communication failure occurs in one network slice, communication in other network slices is not affected, so that it is possible to provide a stable communication service. In the disclosure, the term slice may be used interchangeably with network slice. In such a network environment, the UE may access a plurality of network slices in the case of receiving various services. The network function (NF) may be a software instance running on hardware and may be implemented as a virtualized function instantiated on a network component or an appropriate platform.

The mobile communication carrier may constitute the network slice and may allocate network resources suitable for a specific service for each network slice or set of network slices. The network resource indicates an NF or logical resource provided by the NF or radio resource allocation of a base station.

For example, a mobile communication carrier may constitute network slice A for providing a mobile broadband service, network slice B for providing a vehicle communication service, and network slice C for providing an IoT service. In other words, the 5G network may efficiently provide a corresponding service to a UE through a specialized network slice suited for the characteristics of each service. In a 5G system, a network slice may be represented as single-network slice selection assistance information (S-NSSAI). The S-NSSAI may include a slice/service type (SST) value and a slice differentiator (SD) value. The SST may represent the characteristics of services supported by the network slice (e.g., enhanced mobile broadband (eMBB), Internet of things (IoT), ultra-reliable low-latency communication (URLLC), vehicle-to-everything (V2X), or the like). The SD may be a value used as an additional identifier for a specific service referred to as SST.

Meanwhile, the need for a disaster safety communication network using 5G technology is emerging. A disaster safety communication network is a communication network exclusively used by disaster-related agencies such as police stations, fire departments, and coast guards for disaster response work, enabling prompt communication and effective on-site response by the relevant agencies in the event of a large-scale disaster. In order for users of disaster-related agencies to make a group call using the disaster safety communication network, each agency needs to generate a group by a command device or with support by an operation center of the disaster safety communication network. However, the need for an adhoc group call that enables various agencies dispatched to the site to generate a group call among users dispatched to the site without the help of a manager has emerged. In order to maintain secure communication when a group call is made between users dispatched to the site, a method for safely generating a security key and sending the key to each user is required.

In the case of a group call using the existing disaster safety communication network, secure communication is carried out through a process in which an administrator sends a list of users to be included in the group to a group management server (GMS) and the GMS generates and manages a group, or a process in which a person in charge of monitoring and managing a closed-circuit television (CCTV) at a control center collects and regroups some users in several groups based on the groups generated by the administrator.

The disaster safety communication network users of various agencies dispatched to the site are required to make a group call between the users dispatched to the site without the help of the administrator, and accordingly, research on adhoc group calls is being conducted. In the case of adhoc group call, since users generate a certain group without using the group generated by the administrator, and proceed with a group call, the profile of the user who wants to generate a group may not contain information on a specific user who has been dispatched to the site. In such a case, it is necessary to receive information necessary to protect a key to be used for the group with the help of the mobility service (MCX (MCPTT, MCData, MCVideo)) server.

According to an embodiment of the disclosure, when a user who first requests an adhoc group call requests an MCX server to generate an adhoc group, a process in which the requesting user sends a list of IDs of users who have a certificate or public key of a Key Management Server (KMS) or a list of IDs of users who do not have a certificate or public key of KMS is included.

In addition, according to an embodiment of the disclosure, if the user requesting the group call does not have the KMS certificate or public key of a specific user, the MCX server may include a process of verifying whether the MCX server has the KMS certificate or public key corresponding to the ID of the specific user based on the ID list received from the requesting user, requesting the certificate or public key from the KMS of the MCX server, requesting the above certificate or public key from a partner MCX server, or requesting the KMS certificate or public key from the KMS of the partner server by the partner MCX server.

FIG. 1 illustrates a wireless communication system supporting a disaster safety communication network according to embodiments of the present disclosure.

With reference to FIG. 1, a disaster safety communication network according to the disclosure may include a mobility service (MCX) user equipment (UE) 100 and an ID management server (IdMS) 200. For example, the MCX UE 100 may be referred to as a disaster safety communication network terminal. The MCX UE 100 and the IdMS 200 may establish a secure tunnel with each other S101. The MCX UE 100 of a user using the disaster safety communication network (hereinafter referred to as an MCX client) may perform an authentication procedure with the IdMS 200 S102. For example, the authentication procedure may be performed based on at least one of biometric information, one time password (OTP), and ID/password.

After authenticating the MCX client through the MCX UE 100, the IdMS 200 may deliver unique credential to the MCX UE 100 S103. For example, the IdMS 2000 may transmit an access token to the MCX UE 100. The access token may include a token allowing the MCX UE 100 to access a key management server (KMS) 300, a MCX server 400, a configuration management server (CMS) 500, a group management server (GMS) 600 in FIG. 2.

Figure 2:
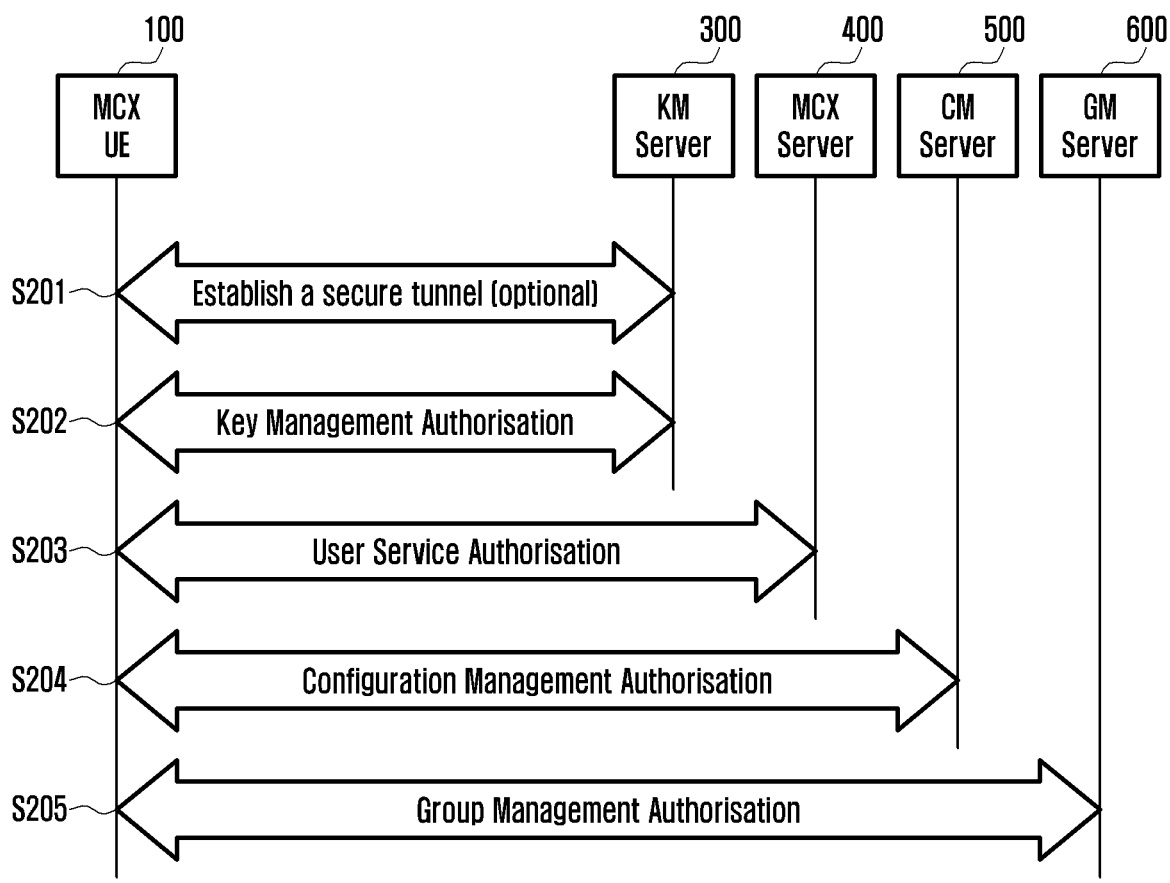
FIG. 2 illustrates a wireless communication system supporting a disaster safety communication network according to embodiments of the present disclosure.

FIG. 2 illustrates a wireless communication system supporting a disaster safety communication network according to embodiments of the present disclosure.

With reference to FIG. 2, the disaster safety communication network according to the disclosure may include the MCX UE 100, the KM server 300, the MCX server 400, the CM server 500, and the GM server 600. The MCX UE 100 and the KM server 300 may establish a secure tunnel with each other S201. Establishing the secure tunnel between the MCX UE 100 and the KM server 300 may be an optional operation.

The MCX UE 100 and the KM server 300 may perform a key management authorization operation with each other S202. For example, the KMS 300 may be a network entity that serves as a root certificate authentic (CA). For example, the KMS 300 may transmit a private key to be used for signature of the MCX UE 100, a certificate of the KMS 300, a certificate of another KMS (not illustrated), and the like to the MCX UE 100.

The MCX UE 100 and the MCX server 400 may perform a user service authorization operation with each other S203. The MCX server 400 may be a server that provides services to the MCX UE 100. For example, the MCX server 400 may be referred to as a mission critical push to talk (MCPTT) server in the case of providing a phone service. For example, the MCX server 400 may be referred to as an MCData server in the case of providing a data transmission service. For example, the MCX server 400 may be referred to as an MCVideo server in the case of providing a video transmission service such as a moving image.

The MCX UE 100 and the CMS 500 may perform a configuration management authorization operation with each other S204. The CMS 500 may be a network entity that manages MC service information not related to a group. For example, the CMS 500 may manage information on users of the disaster safety communication network.

The MCX UE 100 and GMS 600 may perform a group management authorization operation with each other S205. The GMS 600 may be a network entity that manages groups. For example, the GMS 600 may perform an operation of managing the group created between users of the disaster safety communication network or transmitting information on the created group to the MCX server 400.

The MCX UE 100 may obtain permission to access the KMS 300 using the token for the KMS 300 received from the IdMS 200. For example, the MCX UE 100 may establish a secure tunnel with the KMS 300 using a hypertext transfer protocol secure (HTTPS) protocol. The MCX UE 100 may safely receive keys to be used by the MCX UE 100 from the KMS 300 using a pre-provisioned transport key. In addition, the MCX UE 100 may download a user profile usable by the user of the MCX UE 100 from the CMS 500 using the token for the CMS 500 received from the IdMS 200. For example, the user profile may include at least one of an MC service ID of the user of the MCX UE 100, a user ID that can be used for a personal call of the user of the MCX UE 100, and an uniform resource identifier (URI) of KMS 300 connected to the user of the MCX UE 100.

Figure 3:
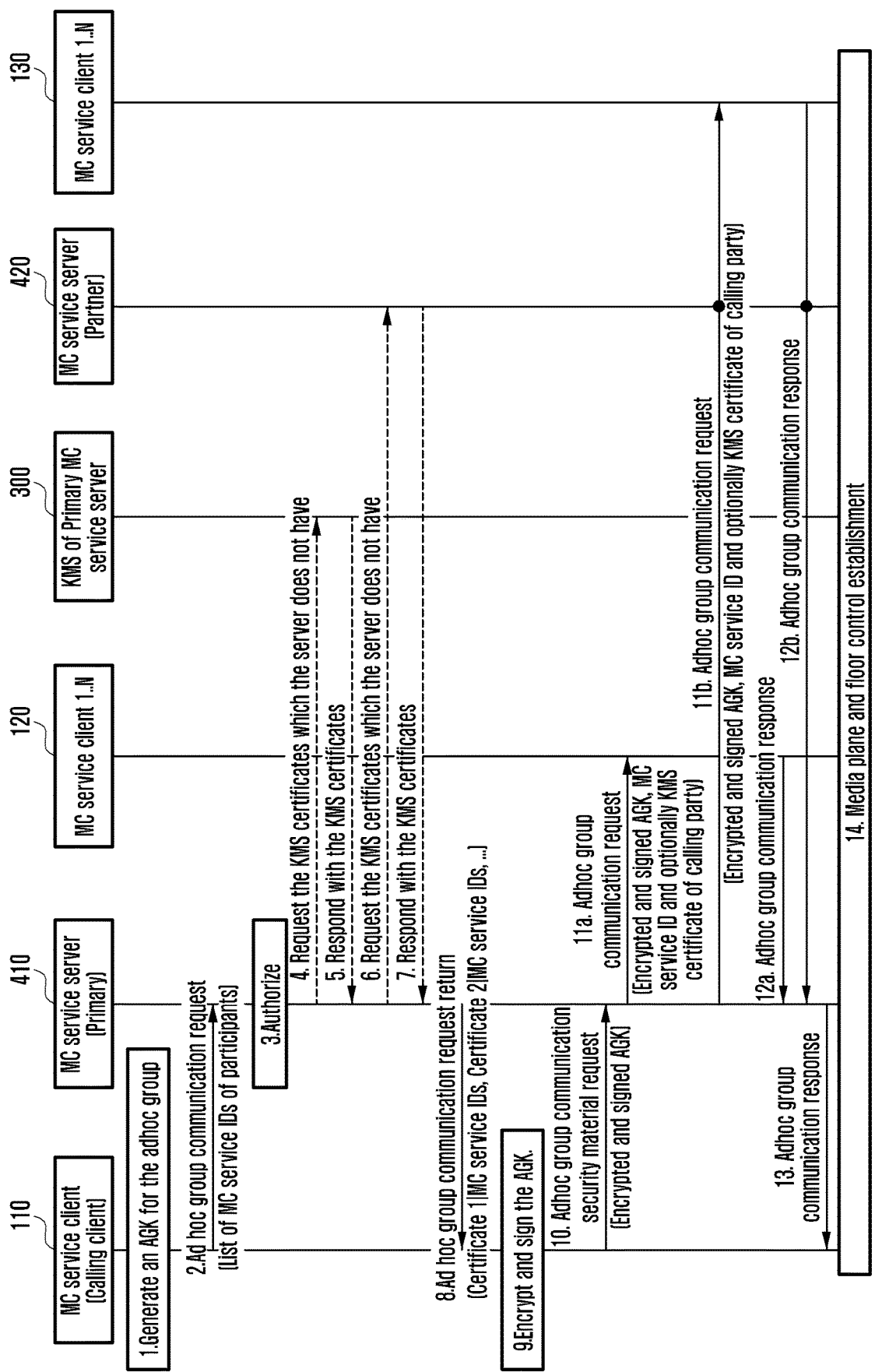
FIG. 3 illustrates flowchart of a procedure in which an MC service client 110 requesting generation of an adhoc group call receives information necessary to protect a key to be used for a group call from an MC service server 410 in a wireless communication system according to embodiments of the present disclosure.

FIG. 3 illustrates a flowchart of a procedure in which an MC service client 110 requesting generation of an adhoc group call receives information necessary to protect a key to be used for a group call from an MC service server 410 in a wireless communication system according to embodiments of the present disclosure.

Although FIG. 3 illustrates two MC systems for convenience of description, the number of MC systems may exceed two. The disclosure is not limited to the steps described below, and the disclosure may be implemented including at least one of the steps described below.

(A1) Pre-Configuration 1

The MC service client 110 that first requests an adhoc group call may store in advance the MC service IDs of the MC service clients 120 and 130 that may participate in the adhoc group call. The number of MC service clients 120 may be plural. For example, the MC service client 120 may be referred to as a plurality of second terminals. The MC service clients 130 may be plural. For example, the MC service client 130 may be referred to as a plurality of third terminals.

(A2) Pre-Configuration 2

The user profile downloaded to the MC service client 110 that first requests the adhoc group call may not include the MC service IDs of some or all users who may participate in the adhoc group and the URIs of the KMS 300. The MC service client 110 may be referred to as a first terminal.

With reference to FIG. 3, in step 1, the MC service client 110 may generate an adhoc group key (AGK) to be used for adhoc group communication. The MC service client 110 may be the same as or similar to the MCX UE 100 in FIG. 1. The MC service client 110 may be the same as or similar to the MCX UE 100 in FIG. 2. The MC service client 110 may be referred to as a calling client.

In step 1, in the case that the certificates of some clients to participate in the adhoc group call are stored in advance, the calling client 110 may encrypt and sign the AGK in advance based on the certificates to reduce the number of operations in a later step. The certificates may be referred to as KMS uniform resource identifiers (URIs) or KMS certificates or authentication information.

In step 2, the calling client 110 may transmit an adhoc group communication request message to the MC service server 410 of the calling client 110. The MC service server 410 may be the same as or similar to the MCX server 400 in FIG. 1. The MC service server 410 may be referred to as a primary MC service server 410. The MC service server 410 may be referred to as a first server 410. The adhoc group communication request message may include a list of IDs (List of MC service IDs of participants) of clients participating in the ad hoc group call. The list including the IDs of clients participating in the adhoc group call may include at least one of client IDs corresponding to the KMS URIs or KMS certificates stored in the calling client 110, and the client IDs corresponding to the KMS URIs or KMS certificates not stored in the calling client 110. The primary MC service server 410 may receive the adhoc group communication request message from the calling client 110.

In step 3, the primary MC service server 410 may authorize whether the calling client 110 is a client authorized for requesting the adhoc group call, based on the adhoc group communication request message.

In step 4, the primary MC service server 410 may confirm whether, with respect to the client ID corresponding to the KMS URI or KMS certificate not stored in the calling client 110, the KMS URI or KMS certificate corresponding to the corresponding client is stored in the primary MC service server 410 based on the list including the IDs of clients participating in ad hoc. After that, the primary MC service server 410 may transmit a message requesting the KMS certificate that is not stored in the primary MC service server 410 or the calling client 110 (request the KMS certificates which the server does not have) to the KMS 300. The KMS 300 may receive the message requesting the KMS certificate not stored in the calling client 110 from the calling client 110.

The KMS 300 may transmit a response message including the KMS certificate to the calling client 110 as a response to the message requesting the KMS certificate (respond with the KMS certificates). The calling client 110 may receive a response message including the KMS certificate from the KMS 300.

In step 6, the primary MC service server 410 may transmit a message requesting the KMS certificate not stored in the calling client 110 to a partner MC service server 420. For example, the primary MC service server 410 may determine the MC service client 420 of the MC system including the MC service server client 130, based on at least one of the ID list of the MC service client 130 corresponding to the KMS URI or KMS certificate not stored in the calling client 110. An ID of a user using the disaster safety communication network may indicate the MC system in which the user is included. The MC service server 420 may be referred to as a partner MC service server 420. The partner MC service server 420 may receive a message requesting the KMS certificate not stored in the calling client 110 from the primary MC service server 410.

Steps 4 to 7 may be selectively performed, and the order of operations may vary. In the case that the primary MC service server 410 previously stores the KMS certificate corresponding to the list of IDs of all clients 120 and 130 that may participate in the adhoc group call, steps 4 to 7 may be omitted.

In step 5, the primary MC service server 410 may omit steps 6 and 7 in the case that the response message including the KMS certificate is received from the KMS 300. In step 5, the primary MC service server 410 may perform steps 6 and 7 in the case that the response message including the KMS certificate is not received from the KMS 300.

The primary MC service server 410 may perform steps 6 to 7 before steps 4 to 5. For example, in step 7, the primary MC service server 410 may omit steps 4 and 5 in the case that the response message including the KMS certificate is received from the partner MC service server 420. In step 7, the primary MC service server 410 may perform steps 4 and 5 in the case that the response message including the KMS certificate is not received from the partner MC service server 420.

In step 8, the primary MC service server 410 may transmit an adhoc group communication request return message to the calling client 110 as a response to the adhoc group communication request message. For example, the adhoc group communication request return message may include the KMS certificate received from the KMS 300 of the primary MC service server 410, the KMS certificate received from the partner MC service server 420, and the ID of the MC service client 130 connected to the partner MC service server 420. The primary MC service server 410 may sign at least one of the KMS certificate of the MC service client 120 received from the KMS 300 and the KMS certificate of the MC service client 130 received from the partner MC service server 420 using at least one of the ID of the primary MC service server 410 and the KMS elliptic curve-based certificate less signatures for identity-based encryption (ECCST) public key. The calling client 110 may receive the adhoc group communication request return message from the primary MC service server 410.

In step 9, the calling client 110 may encrypt the AGK using at least one of the IDs of the clients 120 and 130 participating in the adhoc group call and the KMS Sakai-Kasahara key encryption (KMS SAKKE) public key, based on the adhoc group communication request return message. Based on the adhoc group communication request return message, the calling client 110 may sign the AGK using at least one of the ID of the calling client 110 and the KMS elliptic curve-based certificate less signatures for identity-based encryption (ECCSI) public key.

In step 10, the calling client 110 may transmit an adhoc group communication security material request message to the primary MC service server 410. For example, the adhoc group communication security material request message may include the encrypted and signed AGK. The primary MC service server 410 may receive the adhoc group communication security material request message including the encrypted and signed AGK from the calling client 110.

In step 11a, the primary MC service server 410 may generate an adhoc group communication request message based on the adhoc group communication security material request message. For example, the adhoc group communication request message may include at least one of the encrypted and signed AGK and the KMS certificate of the calling client 110.

The primary MC service server 410 may transmit the adhoc group communication request message to the MC service client 120 connected to the primary MC service server 410. The MC service client 120 may receive the adhoc group communication request message from the primary MC service server 410.

In step 11b, the primary MC service server 410 may transmit the adhoc group communication request message to the partner MC service server 420. The partner MC service server 420 may receive the adhoc group communication request message from the primary MC service server 410. The partner MC service server 420 may transmit the adhoc group communication request message to the MC service client 130 connected to the partner MC service server 420. The MC service client 130 may receive the adhoc group communication request message from the partner MC service server 420.

In step 12a, the MC service client 120 may transmit the adhoc group communication response message to the primary MC service server 410 as a response to the adhoc group communication request message. The primary MC service server 410 may receive the adhoc group communication response message from the MC service client 120.

In step 12b, the MC service client 130 may transmit the adhoc group communication response message to the partner MC service server 420 as a response to the adhoc group communication request message. The partner MC service server 420 may receive the adhoc group communication response message from the MC service client 130. The partner MC service server 420 may transmit the adhoc group communication response message received from the MC service client 130 to the primary MC service server 410. The primary MC service server 410 may receive the adhoc group communication response message from the partner MC service server 420.

In step 13, the primary MC service server 410 may transmit the adhoc group communication response message to the calling client 110 as a response to the adhoc group communication security material request message. The calling client 110 may receive the adhoc group communication response message as a response to the adhoc group communication security material request message from the primary MC service server 410.

In step 14, the calling client 110 may establish a media plane and flow control with the MC service client 120 and the MC service client 130 (Media plane and floor control establishment). For example, the calling client 110 may perform secure communication with the MC service client 120 and the MC service client 130 using the AGK.

Figure 4:
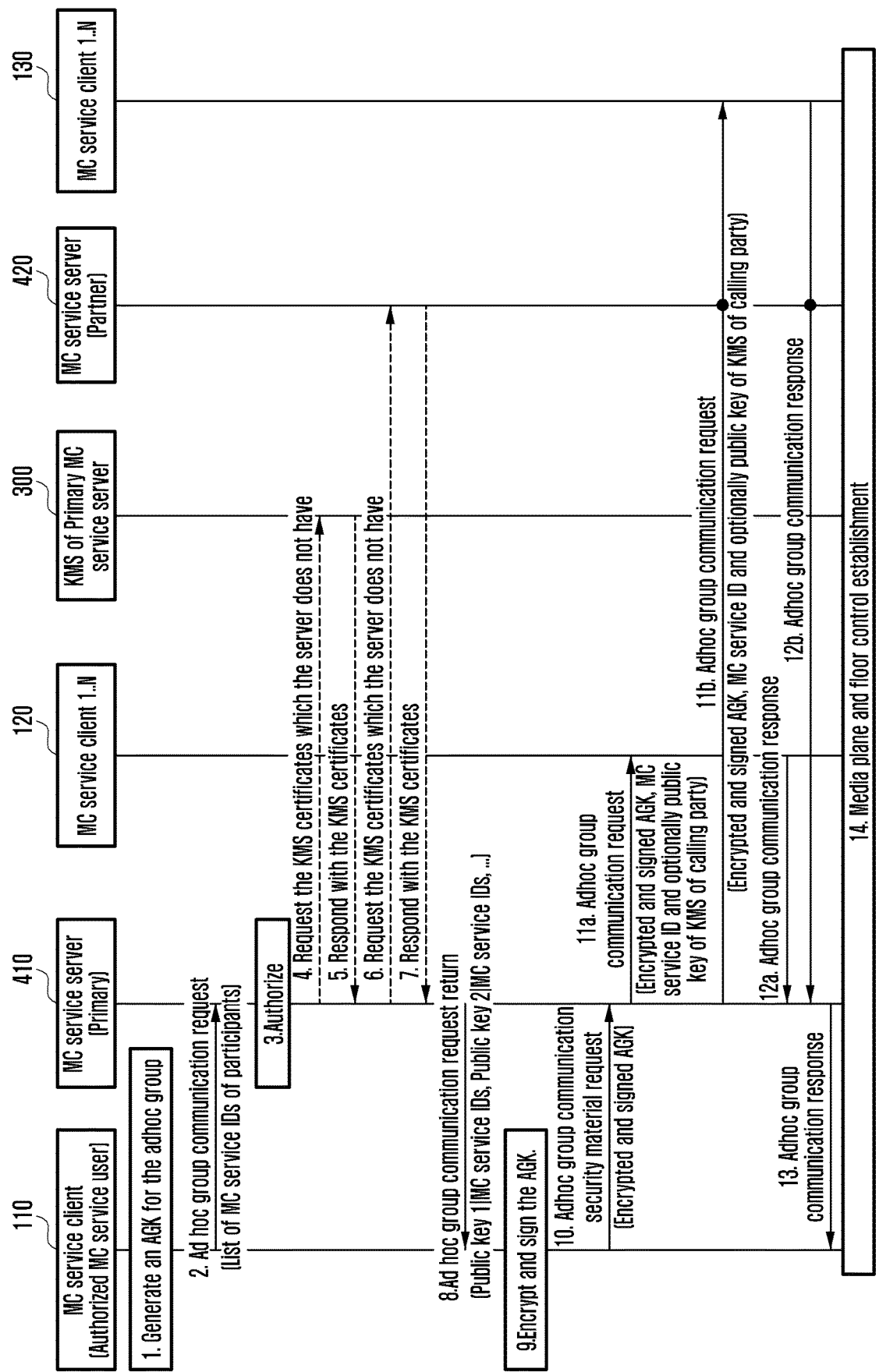
FIG. 4 illustrates a flowchart of a procedure in which an MC service client 110 requesting generation of an adhoc group call receives information necessary to protect a key to be used for a group call from an MC service server 410 in a communication system according to embodiments of the present disclosure.

FIG. 4 illustrates a flowchart of a procedure in which the MC service client 110 requesting generation of an adhoc group call receives information necessary to protect a key to be used for a group call from the MC service server 410 in a wireless communication system according to embodiments of the present disclosure.

Although FIG. 4 illustrates two MC systems for convenience of description, the number of MC systems may exceed two. The disclosure is not limited to the steps described below, and the disclosure may be implemented including at least one of the steps described below.

(B1) Pre-Configuration 1

The MC service client 110 that first requests an adhoc group call may store in advance the MC service IDs of the MC service clients 120 and 130 that may participate in the adhoc group call. The number of MC service clients 120 may be plural. For example, the MC service client 120 may be referred to as a plurality of second terminals. The MC service clients 130 may be plural. For example, the MC service client 130 may be referred to as a plurality of third terminals.

(B2) Pre-Configuration 2

The user profile downloaded to the MC service client 110 that first requests the adhoc group call may not include the MC service IDs of some or all users who may participate in the adhoc group and the URIs of the KMS 300. The MC service client 110 may be referred to as a first terminal.

With reference to FIG. 4, in step 1, the MC service client 110 may generate an adhoc group key (AGK) to be used for adhoc group communication. The MC service client 110 may be the same as or similar to the MCX UE 100 in FIG. 1. The MC service client 110 may be the same as or similar to the MCX UE 100 in FIG. 2. The MC service client 110 may be referred to as a calling client.

In step 1, in the case that the certificates of some clients to participate in the adhoc group call are stored in advance, the calling client 110 may encrypt and sign the AGK in advance based on the certificates to reduce the number of operations in a later step. The certificates may be referred to as KMS uniform resource identifiers (URIs) or KMS certificates.

In step 2, the calling client 110 may transmit an adhoc group communication request message to the MC service server 410 of the calling client 110. The MC service server 410 may be the same as or similar to the MCX server 400 in FIG. 1. The MC service server 410 may be referred to as a primary MC service server 410. The MC service server 410 may be referred to as a first server 410. The adhoc group communication request message may include a list of IDs (List of MC service IDs of participants) of clients participating in the ad hoc group call. The list including the IDs of clients participating in the adhoc group call may include at least one of client IDs corresponding to the KMS URIs or KMS certificates stored in the calling client 110, and the client IDs corresponding to the KMS URIs or KMS certificates not stored in the calling client 110. The primary MC service server 410 may receive the adhoc group communication request message from the calling client 110.

In step 3, the primary MC service server 410 may authorize whether the calling client 110 is a client authorized for requesting the adhoc group call, based on the adhoc group communication request message.

In step 4, the primary MC service server 410 may determine whether, with respect to the client ID corresponding to the KMS URI or KMS certificate not stored in the calling client 110, the KMS URI or KMS certificate corresponding to the corresponding client is stored in the primary MC service server 410 based on the list including the IDs of clients participating in ad hoc. After that, the primary MC service server 410 may transmit a message requesting the KMS certificate that is not stored in the primary MC service server 410 or the calling client 110 (request the KMS certificates which the server does not have) to the KMS 300. The KMS 300 may receive the message requesting the KMS certificate not stored in the calling client 110 from the calling client 110.

The KMS 300 may transmit a response message including the KMS certificate to the calling client 110 as a response to the message requesting the KMS certificate (respond with the KMS certificates). The calling client 110 may receive a response message including the KMS certificate from the KMS 300.

In step 6, the primary MC service server 410 may transmit a message requesting the KMS certificate not stored in the calling client 110 to a partner MC service server 420. For example, the primary MC service server 410 may determine the MC service client 420 of the MC system including the MC service server client 130, based on at least one of the ID list of the MC service client 130 corresponding to the KMS URI or KMS certificate not stored in the calling client 110. An ID of a user using the disaster safety communication network may indicate the MC system in which the user is included. The MC service server 420 may be referred to as a partner MC service server 420. The partner MC service server 420 may receive a message requesting the KMS certificate not stored in the calling client 110 from the primary MC service server 410.

Steps 4 to 7 may be selectively performed, and the order of operations may vary. In the case that the primary MC service server 410 previously stores the KMS certificate corresponding to the list of IDs of all clients 120 and 130 that may participate in the adhoc group call, steps 4 to 7 may be omitted.

In step 5, the primary MC service server 410 may omit steps 6 and 7 in the case that the response message including the KMS certificate is received from the KMS 300. In step 5, the primary MC service server 410 may perform steps 6 and 7 in the case that the response message including the KMS certificate is not received from the KMS 300.

The primary MC service server 410 may perform steps 6 to 7 before steps 4 to 5. For example, in step 7, the primary MC service server 410 may omit steps 4 and 5 in the case that the response message including the KMS certificate is received from the partner MC service server 420. In step 7, the primary MC service server 410 may perform steps 4 and 5 in the case that the response message including the KMS certificate is not received from the partner MC service server 420.

In step 8, the primary MC service server 410 may transmit an adhoc group communication request return message to the calling client 110 as a response to the adhoc group communication request message. For example, the adhoc group communication request return message may include at least one of the KMS SAKKE public key of the MC service client 120 or MC service client 130, the KMS ID of the MC service client 120 or MC service client 130, and the ID of the MC service client 130. The primary MC service server 410 may sign at least one of the KMS SAKKE public key of the MC service client 120 received from KMS 300, the KMS ID of the MC service client 120, the KMS SAKKE public key of the MC service client 130 received from the partner MC service server 420, and the KMS ID of the MC service client 130 using at least one of the ID of the primary MC service server 410 and the KMS elliptic curve-based certificate less signatures for identity-based encryption (ECCSI) public key. The calling client 110 may receive the adhoc group communication request return message from the primary MC service server 410.

In step 9, the calling client 110 may encrypt the AGK using at least one of the IDs of the clients 120 and 130 participating in the adhoc group call and the KMS SAKKE public key, based on the adhoc group communication request return message. Based on the adhoc group communication request return message, the calling client 110 may sign the AGK using at least one of the ID of the calling client 110 and the KMS ECCSI public key.

In step 10, the calling client 110 may transmit an adhoc group communication security material request message to the primary MC service server 410. For example, the adhoc group communication security material request message may include the encrypted and signed AGK. The primary MC service server 410 may receive the adhoc group communication security material request message including the encrypted and signed AGK from the calling client 110.

In step 11*a*, the primary MC service server 410 may generate an adhoc group communication request message based on the adhoc group communication security material request message. For example, the adhoc group communication request message may include at least one of the encrypted and signed AGK, the KMS ECCSI public key of the calling client 110, and the KMS ID of the calling client 110. The primary MC service server 410 may transmit the adhoc group communication request message to the MC service client 120 connected to the primary MC service server 410. The MC service client 120 may receive the adhoc group communication request message from the primary MC service server 410.

In step 11*b*, the primary MC service server 410 may transmit the adhoc group communication request message to the partner MC service server 420. The partner MC service server 420 may receive the adhoc group communication request message from the primary MC service server 410. The partner MC service server 420 may transmit the adhoc group communication request message to the MC service client 130 connected to the partner MC service server 420. The MC service client 130 may receive the adhoc group communication request message from the partner MC service server 420.

In step 12*a*, the MC service client 120 may transmit the adhoc group communication response message to the primary MC service server 410 as a response to the adhoc group communication request message. The primary MC service server 410 may receive the adhoc group communication response message from the MC service client 120.

In step 12*b*, the MC service client 130 may transmit the adhoc group communication response message to the partner MC service server 420 as a response to the adhoc group communication request message. The partner MC service server 420 may receive the adhoc group communication response message from the MC service client 130. The partner MC service server 420 may transmit the adhoc group communication response message received from the MC service client 130 to the primary MC service server 410. The primary MC service server 410 may receive the adhoc group communication response message from the partner MC service server 420.

In step 13, the primary MC service server 410 may transmit the adhoc group communication response message to the calling client 110 as a response to the adhoc group communication security material request message. The calling client 110 may receive the adhoc group communication response message as a response to the adhoc group communication security material request message from the primary MC service server 410.

In step 14, the calling client 110 may establish a media plane and flow control with the MC service client 120 and the MC service client 130 (Media plane and floor control establishment). For example, the calling client 110 may perform secure communication with the MC service client 120 and the MC service client 130 using the AGK.

Figure 5:
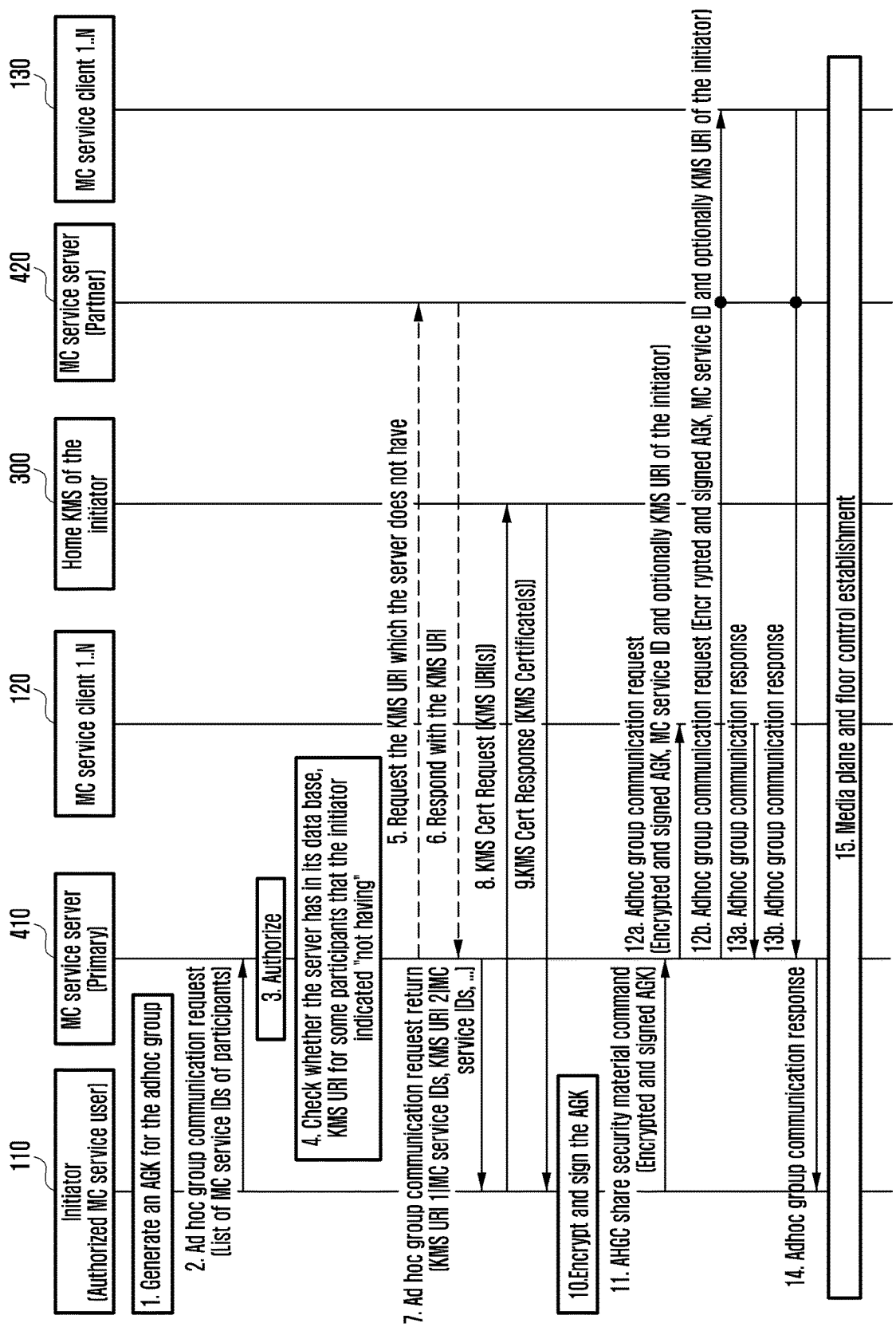
FIG. 5 illustrates a flowchart of a procedure in which an MC service client 110 requesting generation of an adhoc group call receives information necessary to protect a key to be used for a group call from an MC service server 410 in a communication system according to embodiments of the present disclosure.

FIG. 5 illustrates a flowchart of a procedure in which the MC service client 110 requesting generation of an adhoc group call receives information necessary to protect a key to be used for a group call from the MC service server 410 in a wireless communication system according to embodiments of the present disclosure.

Although FIG. 5 illustrates two MC systems for convenience of description, the number of MC systems may exceed two. The disclosure is not limited to the steps described below, and the disclosure may be implemented including at least one of the steps described below.

(C1) Pre-Configuration 1

The MC service client 110 that first requests an adhoc group call may store in advance the MC service IDs of the MC service clients 120 and 130 that may participate in the adhoc group call. The number of MC service clients 120 may be plural. For example, the MC service client 120 may be referred to as a plurality of second terminals. The MC service clients 130 may be plural. For example, the MC service client 130 may be referred to as a plurality of third terminals.

(C2) Pre-Configuration 2

The user profile downloaded to the MC service client 110 that first requests the adhoc group call may not include the MC service IDs of some or all users who may participate in the adhoc group and the URIs of the KMS 300. The MC service client 110 may be referred to as a first terminal.

With reference to FIG. 5, in step 1, the MC service client 110 may generate an adhoc group key (AGK) to be used for adhoc group communication. The MC service client 110 may be the same as or similar to the MCX UE 100 in FIG. 1. The MC service client 110 may be the same as or similar to the MCX UE 100 in FIG. 2. The MC service client 110 may be referred to as an initiator or a calling client.

In step 1, in the case that the certificates of some clients to participate in the adhoc group call are stored in advance, the calling client 110 may encrypt and sign the AGK in advance based on the certificates to reduce the number of operations in a later step. The certificates may be referred to as KMS uniform resource identifiers (URIs) or KMS certificates.

In step 2, the calling client 110 may transmit an adhoc group communication request message to the MC service server 410 of the calling client 110. The MC service server 410 may be the same as or similar to the MCX server 400 in FIG. 1. The MC service server 410 may be referred to as a primary MC service server 410. The MC service server 410 may be referred to as a first server 410. The adhoc group communication request message may include a list of IDs (List of MC service IDs of participants) of clients participating in the ad hoc group call. The list including the IDs of clients participating in the adhoc group call may include at least one of client IDs corresponding to the KMS URIs or KMS certificates stored in the calling client 110, and the client IDs corresponding to the KMS URIs or KMS certificates not stored in the calling client 110. The primary MC service server 410 may receive the adhoc group communication request message from the calling client 110.

In step 3, the primary MC service server 410 may authorize whether the calling client 110 is a client authorized for requesting the adhoc group call, based on the adhoc group communication request message.

In step 4, the primary MC service server 410 may determine whether, with respect to the client ID corresponding to the KMS URI or KMS certificate not stored in the calling client 110, among the client IDs included in the request of the calling client 110 received in step 2, the KMS URI corresponding to the corresponding client is stored in the primary MC service server 410.

In step 5, if the primary MC service server 410 does not store the KMS URI of the specific client 130, the partner MC service server 420 corresponding to the corresponding client 130 is searched and the KMS URI corresponding to the corresponding client 130 may be requested.

In step 6, the partner MC service server 420 may respond with the KMS URI corresponding to the client 130 requested by the primary MC service server 410.

Steps 5 and 6 may be selectively performed, and in the case that the primary MC service server 410 previously stores the KMS certificate corresponding to the list of IDs of all clients 120 and 130 that may participate in the adhoc group call, steps 5 and 6 may be omitted.

In step 7, the primary MC service server 410 may transmit an adhoc group communication request return message to the calling client 110 as a response to the adhoc group communication request message. For example, the adhoc group communication request return message may include at least one of the KMS URI of the MC service client 120 or MC service client 130, the KMS ID of the MC service client 120 or MC service client 130, and the ID of the MC service client 130. The primary MC service server 410 may sign at least one of the KMS URI of the MC service client 120 stored in the primary MC service server 410, the KMS ID of the MC service client 120, the KMS URI of the MC service client 130 received from the partner MC service server 420, and the KMS ID of the MC service client 130 using at least one of the ID of the primary MC service server 410 and the KMS elliptic curve-based certificate less signatures for identity-based encryption (ECCSI) public key. The calling client 110 may receive the adhoc group communication request return message from the primary MC service server 410.

In step 8, the calling client 110 may request a KMS certificate corresponding to the corresponding KMS URI from its own KMS with the KMS URI information received from the primary MC service server 410.

In step 9, the KMS may respond to the calling client 110 with the KMS certificate corresponding to the KMS URI requested by the calling client 110 in step 8.

In step 10, the calling client 110 may encrypt the AGK using at least one of the IDs of the clients 120 and 130 participating in the adhoc group call and the KMS SAKKE public key, based on the adhoc group communication request return message. Based on the adhoc group communication request return message, the calling client 110 may sign the AGK using at least one of the ID of the calling client 110 and the KMS ECCSI public key.

In step 11, the calling client 110 may transmit an adhoc group communication security material request message to the primary MC service server 410. For example, the adhoc group communication security material request message may include the encrypted and signed AGK. The primary MC service server 410 may receive the adhoc group communication security material request message including the encrypted and signed AGK from the calling client 110.

In step 12a, the primary MC service server 410 may generate an adhoc group communication request message based on the adhoc group communication security material request message. For example, the adhoc group communication request message may include at least one of the encrypted and signed AGK, the KMS URI of the calling client 110, and the KMS ID of the calling client 110. The primary MC service server 410 may transmit the adhoc group communication request message to the MC service client 120 connected to the primary MC service server 410. The MC service client 120 may receive the adhoc group communication request message from the primary MC service server 410. Upon receiving the adhoc group communication request message, the MC service client 120 may request and receive the KMS certificate corresponding to the corresponding KMS URI from the KMS of the MC service client 120 using the KMS URI.

In step 12b, the primary MC service server 410 may transmit the adhoc group communication request message to the partner MC service server 420. The adhoc group communication request message may include at least one of the encrypted and signed AGK, the KMS URI of the calling client 110, and the KMS ID of the calling client 110. The partner MC service server 420 may receive the adhoc group communication request message from the primary MC service server 410. The partner MC service server 420 may transmit the adhoc group communication request message to the MC service client 130 connected to the partner MC service server 420. Upon receiving the adhoc group communication request message, the MC service client 130 may request and receive the KMS certificate corresponding to the corresponding KMS URI from the KMS of the MC service client 130 using the KMS URI. The MC service client 130 may receive the adhoc group communication request message from the partner MC service server 420. In step 12a, the MC service client 120 may transmit the adhoc group communication response message to the primary MC service server 410 as a response to the adhoc group communication request message. The primary MC service server 410 may receive the adhoc group communication response message from the MC service client 120.

In step 13b, the MC service client 130 may transmit the adhoc group communication response message to the partner MC service server 420 as a response to the adhoc group communication request message. The partner MC service server 420 may receive the adhoc group communication response message from the MC service client 130. The partner MC service server 420 may transmit the adhoc group communication response message received from the MC service client 130 to the primary MC service server 410. The primary MC service server 410 may receive the adhoc group communication response message from the partner MC service server 420.

In step 14, the primary MC service server 410 may transmit the adhoc group communication response message to the calling client 110 as a response to the adhoc group communication security material request message. The calling client 110 may receive the adhoc group communication response message as a response to the adhoc group communication security material request message from the primary MC service server 410.

In step 15, the calling client 110 may establish a media plane and flow control with the MC service client 120 and the MC service client 130 (Media plane and floor control establishment). For example, the calling client 110 may perform secure communication with the MC service client 120 and the MC service client 130 using the AGK.

Figure 6:
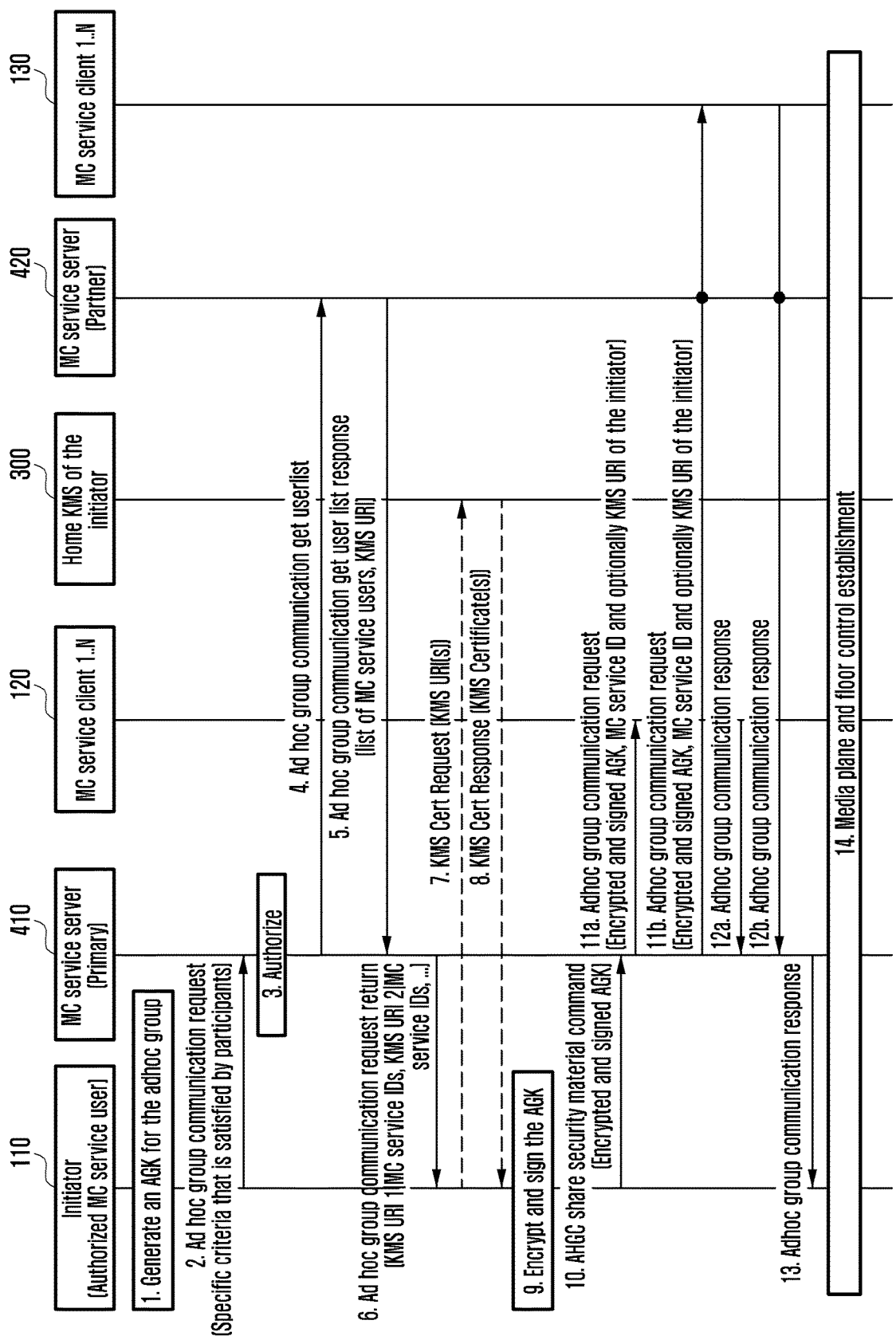
FIG. 6 illustrates a flowchart of a procedure in which an MC service client 110 requesting generation of an adhoc group call receives information necessary to protect a key to be used for a group call from an MC service server 410 in a communication system according to embodiments of the present disclosure.

FIG. 6 illustrates a flowchart of a procedure in which the MC service client 110 requesting generation of an adhoc group call receives information necessary to protect a key to be used for a group call from the MC service server 410 in a wireless communication system according to embodiments of the present disclosure.

Although FIG. 6 illustrates two MC systems for convenience of description, the number of MC systems may exceed two. The disclosure is not limited to the steps described below, and the disclosure may be implemented including at least one of the steps described below.

(D1) Pre-Configuration 1

The user profile downloaded to the MC service client 110 that first requests an adhoc group call may not include the MC service IDs of some or all users who may participate in the adhoc group and the URIs of the KMS 300. The MC service client 110 may be referred to as a first terminal.

With reference to FIG. 6, in step 1, the MC service client 110 may generate an adhoc group key (AGK) to be used for adhoc group communication. The MC service client 110 may be the same as or similar to the MCX UE 100 in FIG. 1. The MC service client 110 may be the same as or similar to the MCX UE 100 in FIG. 2. The MC service client 110 may be referred to as an initiator or a calling client.

In step 1, in the case that the certificates of some clients to participate in the adhoc group call are stored in advance, the calling client 110 may encrypt and sign the AGK in advance based on the certificates to reduce the number of operations in a later step. The certificates may be referred to as KMS uniform resource identifiers (URIs) or KMS certificates.

In step 2, the calling client 110 may transmit an adhoc group communication request message to the MC service server 410 of the calling client 110. The MC service server 410 may be the same as or similar to the MCX server 400 in FIG. 1. The MC service server 410 may be referred to as a primary MC service server 410. The MC service server 410 may be referred to as a first server 410. The adhoc group communication request message may include criteria desired by the calling client 110. The criteria may represent, for example, clients that are in the vicinity of the calling client 110. The primary MC service server 410 may receive the adhoc group communication request message from the calling client 110.

In step 3, the primary MC service server 410 may authorize whether the calling client 110 is a client authorized for requesting the adhoc group call, based on the adhoc group communication request message.

In step 4, the primary MC service server 410 may request the partner MC service server 420 to search for a client that satisfies the condition desired by the calling client 110 in step 2.

In step 5, the partner MC service server 420 may respond with the ID list of clients meeting the conditions and the KMS URI of the corresponding client.

In step 6, the primary MC service server 410 may transmit a adhoc group communication request return message to the calling client 110 as a response to the adhoc group communication request message. For example, the adhoc group communication request return message may include at least one of the KMS URI of the MC service client 120 or MC service client 130, the KMS ID of the MC service client 120 or MC service client 130, and the ID of the MC service client 130. The primary MC service server 410 may sign at least one of the KMS URI of the MC service client 120 stored in the primary MC service server 410, the KMS ID of the MC service client 120, the KMS URI of the MC service client 130 received from the partner MC service server 420, and the KMS ID of the MC service client 130 using at least one of the ID of the primary MC service server 410 and the KMS elliptic curve-based certificate less signatures for identity-based encryption (ECCSI) public key. The calling client 110 may receive the adhoc group communication request return message from the primary MC service server 410.

In step 7, the calling client 110 may request a KMS certificate corresponding to the corresponding KMS URI from its own KMS with the KMS URI information received from the primary MC service server 410.

In step 8, the KMS may respond to the calling client 110 with the KMS certificate corresponding to the KMS URI requested by the calling client 110 in step 7.

In step 9, the calling client 110 may encrypt the AGK using at least one of the IDs of the clients 120 and 130 participating in the adhoc group call and the KMS SAKKE public key. The calling client 110 may sign the AGK using at least one of the ID of the calling client 110 and the KMS ECCSI public key.

In step 10, the calling client 110 may transmit an adhoc group communication security material sharing request message to the primary MC service server 410. For example, the adhoc group communication security material request message may include the encrypted and signed AGK. The primary MC service server 410 may receive the adhoc group communication security material sharing request message including the encrypted and signed AGK from the calling client 110.

In step 11a the primary MC service server 410 may generate an adhoc group communication request message based on the adhoc group communication security material sharing request message. For example, the adhoc group communication request message may include at least one of the encrypted and signed AGK, the KMS URI of the calling client 110, and the KMS ID of the calling client 110. The primary MC service server 410 may transmit the adhoc group communication request message to the MC service client 120 connected to the primary MC service server 410. The MC service client 120 may receive the adhoc group communication request message from the primary MC service server 410. Upon receiving the adhoc group communication request message, the MC service client 120 may request and receive the KMS certificate corresponding to the corresponding KMS URI from the KMS of the MC service client 120 using the KMS URI.

In step 11b, the primary MC service server 410 may transmit the adhoc group communication request message to the partner MC service server 420. The adhoc group communication request message may include at least one of the encrypted and signed AGK, the KMS URI of the calling client 110, and the KMS ID of the calling client 110. The partner MC service server 420 may receive the adhoc group communication request message from the primary MC service server 410. The partner MC service server 420 may transmit the adhoc group communication request message to the MC service client 130 connected to the partner MC service server 420. Upon receiving the adhoc group communication request message, the MC service client 130 may request and receive the KMS certificate corresponding to the corresponding KMS URI from the KMS of the MC service client 130 using the KMS URI. The MC service client 130 may receive the adhoc group communication request message from the partner MC service server 420. In step 11a, the MC service client 120 may transmit the adhoc group communication response message to the primary MC service server 410 as a response to the adhoc group communication request message. The primary MC service server 410 may receive the adhoc group communication response message from the MC service client 120.

In step 12b, the MC service client 130 may transmit the adhoc group communication response message to the partner MC service server 420 as a response to the adhoc group communication request message. The partner MC service server 420 may receive the adhoc group communication response message from the MC service client 130. The partner MC service server 420 may transmit the adhoc group communication response message received from the MC service client 130 to the primary MC service server 410. The primary MC service server 410 may receive the adhoc group communication response message from the partner MC service server 420.

In step 13, the primary MC service server 410 may transmit the adhoc group communication response message to the calling client 110 as a response to the adhoc group communication security material sharing request message. The calling client 110 may receive the adhoc group communication response message as a response to the adhoc group communication security material sharing request message from the primary MC service server 410.

In step 14, the calling client 110 may establish a media plane and flow control with the MC service client 120 and the MC service client 130 (Media plane and floor control establishment). For example, the calling client 110 may perform secure communication with the MC service client 120 and the MC service client 130 using the AGK.

Figure 7:
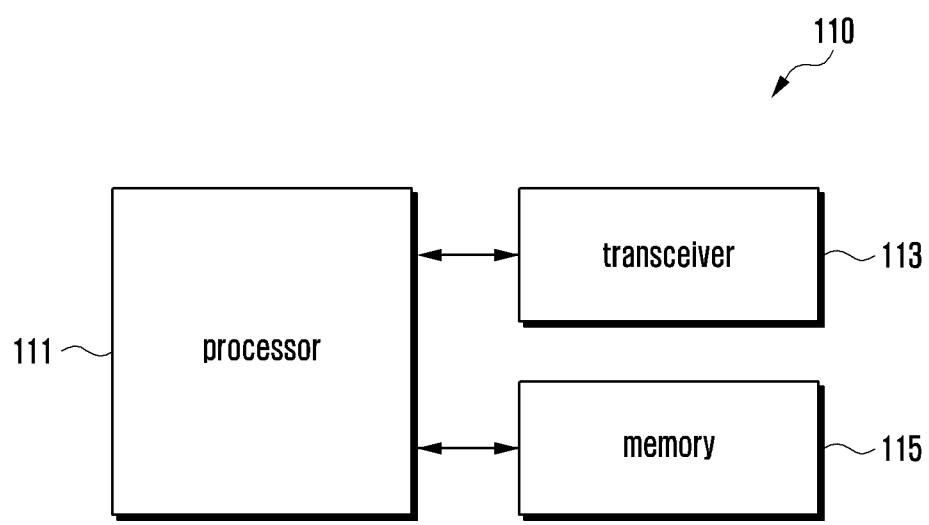
FIG. 7 illustrates a first terminal 110 in a wireless communication system according to embodiments of the present disclosure.

FIG. 7 illustrates a first terminal 110 in a wireless communication system according to embodiments of the present disclosure.

With reference to FIG. 7, the first terminal 110 may include a processor 111 controlling overall operations of the first terminal 110, a transceiver 113 including a transmitter and a receiver, and a memory 115 according to one or a combination of two or more embodiments of the embodiments of FIGS. 1 to 6. However, the first terminal 110 is not limited to the above example, and may include more or fewer components than those illustrated in FIG. 7. According to the disclosure, transceiver 113 may transmit or receive a signal to or from at least one of other network entities or terminals. A signal transmitted or received to or from at least one of other network entities or terminals may include at least one of control information and data.

In FIG. 7, the processor 111 may control overall operations of the first terminal 110 to perform operations according to one or a combination of two or more embodiments of the above-described embodiments of FIGS. 1 to 6. Meanwhile, the processor 111, the transceiver 113 and the memory 115 are not necessarily to be implemented as separate modules but may also be implemented as a single component, for example, in the form of a single chip. The processor 111 and the transceiver 113 may be electrically connected to each other. Also, the processor 111 may be an application processor (AP), a communication processor (CP), a circuit, an application-specific circuit, or at least one processor. The transceiver 113 may include a communication interface for transmitting or receiving signals to or from other network entities wired/wireless.

According to the disclosure, the memory 115 may store data such as a basic program for operation of the first terminal 110 (e.g., MC service client), an application program, configuration information, or the like. In addition, the memory 115 provides stored data according to a request from the processor 111. The memory 115 may be constituted in a storage medium, such as read-only memory (ROM), random access memory (RAM), a hard disk, compact disc-ROM (CD-ROM), or digital versatile disc (DVD), or a combination thereof. Also, the memory 115 may be included by a plural number. Also, the processor 111 may execute at least one of the above-described embodiments based on a program stored in the memory 115, the program being designed to perform at least one of the above-described embodiments of the disclosure.

Also, the program may be stored in an attachable storage device accessible through a communication network implemented as Internet, intranet, local area network (LAN), wide LAN (WLAN), storage area network (SAN), or a combination thereof. The storage device may be attached to the device performing the embodiments of the disclosure by means of an external port. It may also be possible for a separate storage device installed on a communication network to attach to the device performing the embodiments of the disclosure.

Figure 8:
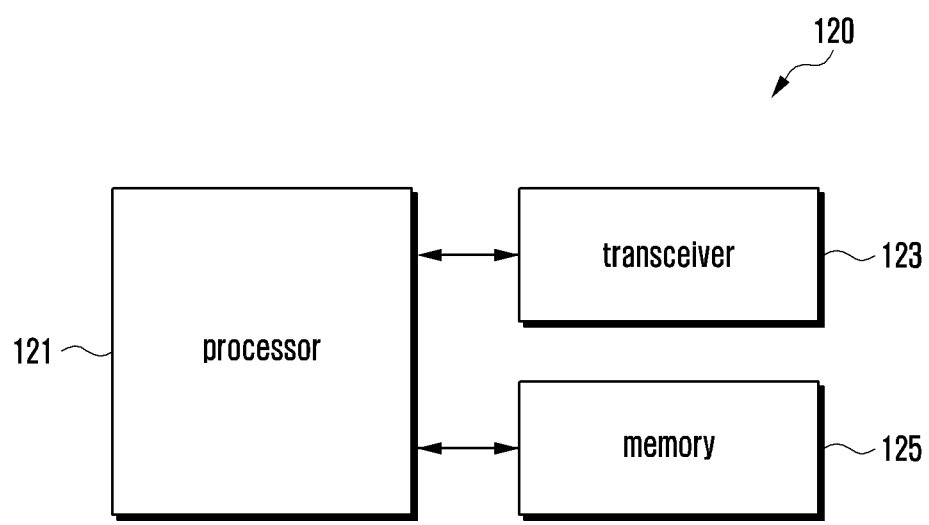
FIG. 8 illustrates a second terminal 120 in a wireless communication system according to embodiments of the present disclosure.

FIG. 8 illustrates a second terminal 120 in a wireless communication system according to embodiments of the present disclosure.

With reference to FIG. 8, the second terminal 120 may include a processor 121 controlling overall operations of the second terminal 120, a transceiver 123 including a transmitter and a receiver, and a memory 125 according to one or a combination of two or more embodiments of the embodiments of FIGS. 1 to 6. However, the second terminal 120 is not limited to the above example, and may include more or fewer components than those illustrated in FIG. 8. According to the disclosure, transceiver 123 may transmit or receive a signal to or from at least one of other network entities or terminals. A signal transmitted or received to or from at least one of other network entities or terminals may include at least one of control information and data.

In FIG. 8, the processor 121 may control overall operations of the second terminal 120 to perform operations according to one or a combination of two or more embodiments of the above-described embodiments of FIGS. 1 to 6. Meanwhile, the processor 121, the transceiver 123 and the memory 125 are not necessarily to be implemented as separate modules but may also be implemented as a single component, for example, in the form of a single chip. The processor 121 and the transceiver 123 may be electrically connected to each other. Also, the processor 121 may be an application processor (AP), a communication processor (CP), a circuit, an application-specific circuit, or at least one processor. The transceiver 123 may include a communication interface for transmitting or receiving signals to or from other network entities wired/wireless.

According to the disclosure, the memory 125 may store data such as a basic program for operation of the second terminal 120 (e.g., MC service client), an application program, configuration information, or the like. In addition, the memory 125 provides stored data according to a request from the processor 121. The memory 125 may be constituted in a storage medium, such as read-only memory (ROM), random access memory (RAM), a hard disk, compact disc-ROM (CD-ROM), or digital versatile disc (DVD), or a combination thereof. Also, the memory 125 may be included by a plural number. Also, the processor 121 may execute at least one of the above-described embodiments based on a program stored in the memory 125, the program being designed to perform at least one of the above-described embodiments of the disclosure.

Also, the program may be stored in an attachable storage device accessible through a communication network implemented as Internet, intranet, Local Area Network (LAN), Wide LAN (WLAN), Storage Area Network (SAN), or a combination thereof. The storage device may be attached to the device performing the embodiments of the disclosure by means of an external port. It may also be possible for a separate storage device installed on a communication network to attach to the device performing the embodiments of the disclosure.

Figure 9:
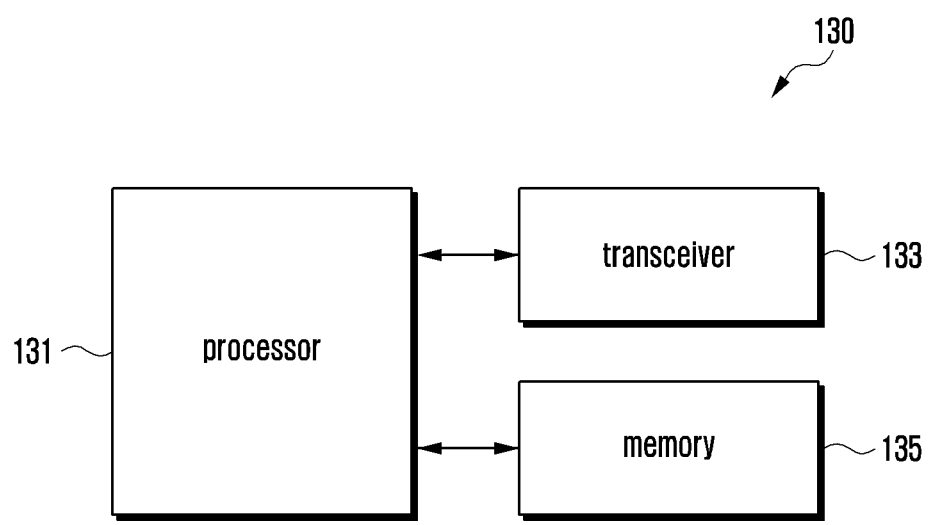
FIG. 9 illustrates a third terminal 130 in a wireless communication system according to embodiments of the present disclosure.

FIG. 9 illustrates a third terminal 130 in a wireless communication system according to embodiments of the present disclosure.

With reference to FIG. 9, the third terminal 130 may include a processor 131 controlling overall operations of the third terminal 130, a transceiver 113 including a transmitter and a receiver, and a memory 135 according to one or a combination of two or more embodiments of the embodiments of FIGS. 1 to 6. However, the third terminal 130 (e.g., MC service client) is not limited to the above example, and may include more or fewer components than those illustrated in FIG. 9. According to the disclosure, transceiver 133 may transmit or receive a signal to or from at least one of other network entities or terminals. A signal transmitted or received to or from at least one of other network entities or terminals may include at least one of control information and data.

In FIG. 9, the processor 131 may control overall operations of the third terminal 130 to perform operations according to one or a combination of two or more embodiments of the above-described embodiments of FIGS. 1 to 6. Meanwhile, the processor 131, the transceiver 133 and the memory 135 are not necessarily to be implemented as separate modules but may also be implemented as a single component, for example, in the form of a single chip. The processor 131 and the transceiver 133 may be electrically connected to each other. Also, the processor 131 may be an application processor (AP), a communication processor (CP), a circuit, an application-specific circuit, or at least one processor. The transceiver 133 may include a communication interface for transmitting or receiving signals to or from other network entities wired/wireless.

According to the disclosure, the memory 135 may store data such as a basic program for operation of the third terminal 130, an application program, configuration information, or the like. In addition, the memory 135 provides stored data according to a request from the processor 131. The memory 135 may be constituted in a storage medium, such as read-only memory (ROM), random access memory (RAM), a hard disk, compact disc-ROM (CD-ROM), or digital versatile disc (DVD), or a combination thereof. Also, the memory 135 may be included by a plural number. Also, the processor 131 may execute at least one of the above-described embodiments based on a program stored in the memory 135, the program being designed to perform at least one of the above-described embodiments of the disclosure.

Also, the program may be stored in an attachable storage device accessible through a communication network implemented as Internet, intranet. Local Area Network (LAN), Wide LAN (WLAN), Storage Area Network (SAN), or a combination thereof. The storage device may be attached to the device performing the embodiments of the disclosure by means of an external port. It may also be possible for a separate storage device installed on a communication network to attach to the device performing the embodiments of the disclosure.

Figure 10:
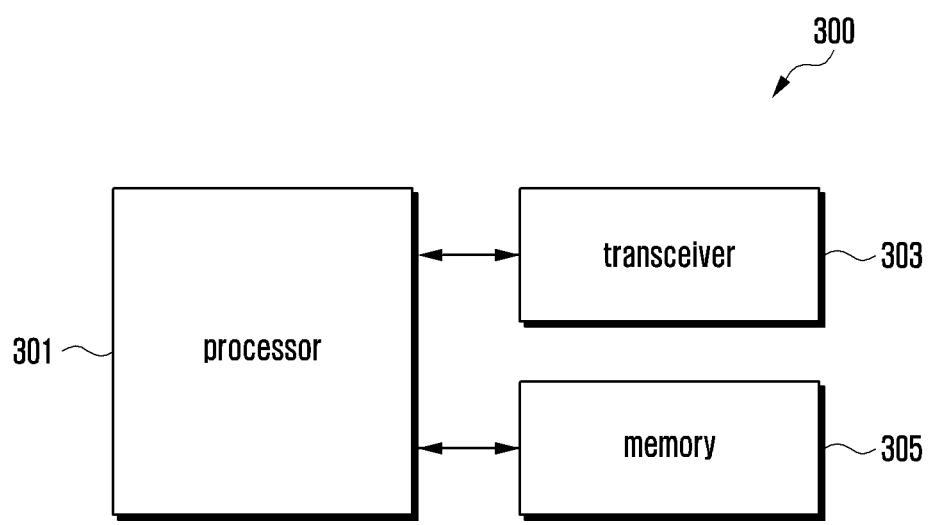
FIG. 10 illustrates a KMS 300 in a wireless communication system according to embodiments of the present disclosure.

FIG. 10 illustrates the KMS 300 in a wireless communication system according to embodiments of the present disclosure.

With reference to FIG. 10, the KMS 300 may include a processor 301 controlling overall operations of the KMS 300, a transceiver 303 including a transmitter and a receiver, and a memory 305 according to one or a combination of two or more embodiments of the embodiments of FIGS. 1 to 6. However, the KMS 300 is not limited to the above example, and may include more or fewer components than those illustrated in FIG. 10. According to the disclosure, transceiver 303 may transmit or receive a signal to or from at least one of other network entities or terminals. A signal transmitted or received to or from at least one of other network entities or terminals may include at least one of control information and data.

In FIG. 10, the processor 301 may control overall operations of the KMS 300 to perform operations according to one or a combination of two or more embodiments of the above-described embodiments of FIGS. 1 to 6. Meanwhile, the processor 301, the transceiver 303 and the memory 305 are not necessarily to be implemented as separate modules but may also be implemented as a single component, for example, in the form of a single chip. The processor 301 and the transceiver 303 may be electrically connected to each other. Also, the processor 301 may be an application processor (AP), a communication processor (CP), a circuit, an application-specific circuit, or at least one processor. The transceiver 303 may include a communication interface for transmitting or receiving signals to or from other network entities wired/wireless.

According to the disclosure, the memory 305 may store data such as a basic program for operation of the KMS 300, an application program, configuration information, or the like. In addition, the memory 305 provides stored data according to a request from the processor 301. The memory 305 may be constituted in a storage medium, such as read-only memory (ROM), random access memory (RAM), a hard disk, compact disc-ROM (CD-ROM), or digital versatile disc (DVD), or a combination thereof. Also, the memory 305 may be included by a plural number. Also, the processor 301 may execute at least one of the above-described embodiments based on a program stored in the memory 305, the program being designed to perform at least one of the above-described embodiments of the disclosure.

Also, the program may be stored in an attachable storage device accessible through a communication network implemented as Internet, intranet, local area network (LAN), wide LAN (WLAN), storage area network (SAN), or a combination thereof. The storage device may be attached to the device performing the embodiments of the disclosure by means of an external port. It may also be possible for a separate storage device installed on a communication network to attach to the device performing the embodiments of the disclosure.

Figure 11:
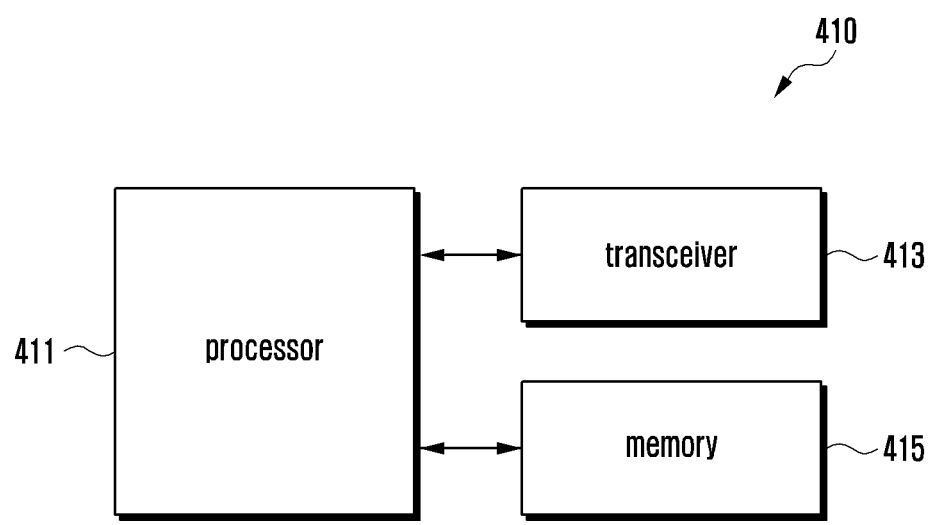
FIG. 11 illustrates a first server 410 in a wireless communication system according to embodiments of the present disclosure.

FIG. 11 illustrates a first server 410 in a wireless communication system according to embodiments of the present disclosure.

With reference to FIG. 11, the first server 410 may include a processor 411 controlling overall operations of the first server 410, a transceiver 413 including a transmitter and a receiver, and a memory 415 according to one or a combination of two or more embodiments of the embodiments of FIGS. 1 to 6. However, the first server 410 is not limited to the above example, and may include more or fewer components than those illustrated in FIG. 11. According to the disclosure, transceiver 413 may transmit or receive a signal to or from at least one of other network entities or terminals. A signal transmitted or received to or from at least one of other network entities or terminals may include at least one of control information and data.

In FIG. 11, the processor 411 may control overall operations of the first server 410 to perform operations according to one or a combination of two or more embodiments of the above-described embodiments of FIGS. 1 to 6. Meanwhile, the processor 411, the transceiver 413 and the memory 415 are not necessarily to be implemented as separate modules but may also be implemented as a single component, for example, in the form of a single chip. The processor 411 and the transceiver 413 may be electrically connected to each other. Also, the processor 411 may be an application processor (AP), a communication processor (CP), a circuit, an application-specific circuit, or at least one processor. The transceiver 413 may include a communication interface for transmitting or receiving signals to or from other network entities wired/wireless.

According to the disclosure, the memory 415 may store data such as a basic program for operation of the first server 410, an application program, configuration information, or the like. In addition, the memory 415 provides stored data according to a request from the processor 411. The memory 415 may be constituted in a storage medium, such as read-only memory (ROM), random access memory (RAM), a hard disk, compact disc-ROM (CD-ROM), or digital versatile disc (DVD), or a combination thereof. Also, the memory 415 may be included by a plural number. Also, the processor 411 may execute at least one of the above-described embodiments based on a program stored in the memory 415, the program being designed to perform at least one of the above-described embodiments of the disclosure.

Also, the program may be stored in an attachable storage device accessible through a communication network implemented as Internet, intranet, local area network (LAN), wide LAN (WLAN), storage area network (SAN), or a combination thereof. The storage device may be attached to the device performing the embodiments of the disclosure by means of an external port. It may also be possible for a separate storage device installed on a communication network to attach to the device performing the embodiments of the disclosure.

Figure 12:
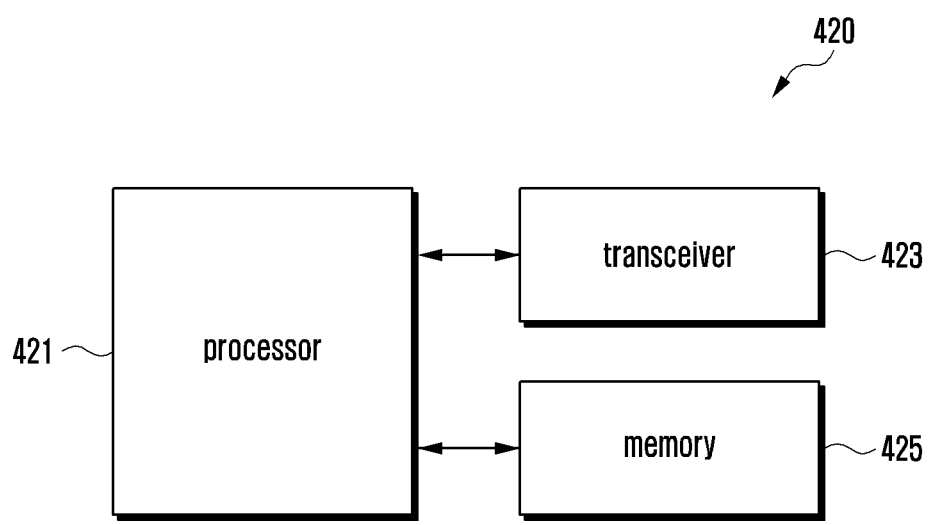
FIG. 12 illustrates a second server 420 in a wireless communication system according to embodiments of the present disclosure.

FIG. 12 illustrates a second server 420 in a wireless communication system according to embodiments of the present disclosure.

With reference to FIG. 12, the second server 420 may include a processor 421 controlling overall operations of the second server 420, a transceiver 423 including a transmitter and a receiver, and a memory 425 according to one or a combination of two or more embodiments of the embodiments of FIGS. 1 to 6. However, the second server 420 is not limited to the above example, and may include more or fewer components than those illustrated in FIG. 12. According to the disclosure, transceiver 423 may transmit or receive a signal to or from at least one of other network entities or terminals. A signal transmitted or received to or from at least one of other network entities or terminals may include at least one of control information and data.

In FIG. 12, the processor 421 may control overall operations of the second server 420 to perform operations according to one or a combination of two or more embodiments of the above-described embodiments of FIGS. 1 to 6. Meanwhile, the processor 421, the transceiver 423 and the memory 425 are not necessarily to be implemented as separate modules but may also be implemented as a single component, for example, in the form of a single chip. The processor 421 and the transceiver 423 may be electrically connected to each other. Also, the processor 421 may be an application processor (AP), a communication processor (CP), a circuit, an application-specific circuit, or at least one processor. The transceiver 423 may include a communication interface for transmitting or receiving signals to or from other network entities wired/wireless.

According to the disclosure, the memory 425 may store data such as a basic program for operation of the second server 420, an application program, configuration information, or the like. In addition, the memory 425 provides stored data according to a request from the processor 421. The memory 425 may be constituted in a storage medium, such as read-only memory (ROM), random access memory (RAM), a hard disk, compact disc-ROM (CD-ROM), or digital versatile disc (DVD), or a combination thereof. Also, the memory 425 may be included by a plural number. Also, the processor 421 may execute at least one of the above-described embodiments based on a program stored in the memory 425, the program being designed to perform at least one of the above-described embodiments of the disclosure.

Also, the program may be stored in an attachable storage device accessible through a communication network implemented as Internet, intranet, local area network (LAN), wide LAN (WLAN), storage area network (SAN), or a combination thereof. The storage device may be attached to the device performing the embodiments of the disclosure by means of an external port. It may also be possible for a separate storage device installed on a communication network to attach to the device performing the embodiments of the disclosure.

It should be noted that the above-described structural diagram, an exemplary diagram of a method of transmitting a control/data signal, an exemplary diagram of an operation procedure, and structural diagrams are not intended to limit the scope of the disclosure. That is, all components, network entities, or steps of operation described in the embodiments of the disclosure should not be interpreted as being essential components for the implementation of the disclosure, and the disclosure may be implemented within the scope that does not impair the essence of the disclosure, by including only some components. Also, the respective embodiments of the disclosure may be combined with each other as required. For example, portions of the methods according to the disclosure may be combined with each other to enable a network entity and a terminal to operate.

In the above-described particular embodiments of the disclosure, components included in the disclosure are expressed in a singular or plural form according to the particular embodiments of the disclosure. However, the singular or plural form is appropriately selected for convenience of explanation and the disclosure is not limited thereto. As such, a component expressed in a plural form may also be constituted as a single component, and a component expressed in a singular form may also be configured as plural components.

Although specific embodiments have been described in the detailed description of the disclosure, various modifications are possible without departing from the scope of the disclosure. Therefore, the scope of the disclosure should not be limited to the described embodiments and should be determined by the claims described below as well as the claims and equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a first terminal connected to a first server in a wireless communication system, the method comprising:

generating an adhoc group key (AGK) for an adhoc group;

transmitting, to the first server, an adhoc group communication request message including a list including identifications (IDs) of a plurality of second terminals included in the adhoc group and connected to the first server;

receiving, from the first server, an adhoc group communication return message signed by the first server, wherein the adhoc group communication return message includes second authentication information related to the plurality of second terminals and corresponds to the adhoc group communication request message;

performing an encryption and signing operation on the AGK based on first authentication information related to the first terminal and the second authentication information, the first authentication information is pre-stored at the first terminal;

transmitting, to the first server, an adhoc group communication security material request message including the AGK that is encrypted and signed;

receiving, from the first server, an adhoc group communication response message in response to transmitting the adhoc group communication security material request message; and performing a secure communication with the plurality of second terminals based on the adhoc group communication response message.

2. The method of claim 1, wherein the list indicates a first ID of a terminal corresponding to the first authentication information among the plurality of second terminals and a second ID of a terminal not corresponding to the first authentication information among the plurality of second terminals.

3. The method of claim 1, wherein the second authentication information includes a certificate of a first key management (KM) server connected to the first server.

4. The method of claim 1, wherein the second authentication information includes at least one of a Sakai-Kasahara key encryption (SAKKE) public key and a server ID of a first KM server connected to the first server.

5. The method of claim 1, wherein the list includes IDs of a plurality of third terminals included in the adhoc group and connected to a second server.

6. The method of claim 5, wherein the list indicates a first ID of a terminal corresponding to the first authentication information among the plurality of third terminals and a second ID of a terminal not corresponding to the first authentication information among the plurality of third terminals.

7. The method of claim 6, wherein the adhoc group communication return message includes third authentication information related to the terminal that does not correspond to the first authentication information among the plurality of third terminals.

8. The method of claim 7, wherein the third authentication information includes a certificate of a second KM server connected to the second server.

9. The method of claim 7, wherein the third authentication information includes at least one of a SAKKE public key or a server ID of a first KM server connected to the second server.

10. The method of claim 7, wherein the encryption and signing operation is performed based on the first authentication information, the second authentication information, and the third authentication information,
the secure communication is performed with the plurality of second terminals and the plurality of third terminals.

11. A method of a first server in a wireless communication system, comprising:
receiving, from a first terminal, an adhoc group communication request message including a list including identifications (IDs) of a plurality of second terminals included in an adhoc group and connected to the first server;
transmitting, to a first key management (KM) server, a certificate request message requesting second authentication information related to the plurality of second terminals, wherein the first KM server is connected to the first server based on the adhoc group communication request message;
receiving, from the first KM server, a certificate response message including the second authentication information, wherein the certificate response message corresponds to the certificate request message;
performing a signature operation on the second authentication information based on the certificate response message;

transmitting, to the first terminal, an adhoc group communication return message including the second authentication information that is signed; receiving, from the first terminal, an encrypted and signed AGK in response to receiving the adhoc group communication return message;
transmitting, to the plurality of second terminals, an adhoc group communication request message including the encrypted and signed AGK and a first authentication information;
receiving, from the plurality of second terminals, an adhoc group communication response message corresponding to the adhoc group communication request message;
transmitting, to the first terminal, the adhoc group communication response message; and
performing a secure communication with the first terminal and the plurality of second terminals based on the adhoc group communication response message.

12. The method of claim 11, wherein the list indicates a first ID of a terminal corresponding to the first authentication information among the plurality of second terminals and a second ID of a terminal not corresponding to the first authentication information among the plurality of second terminals.

13. The method of claim 11, wherein the second authentication information includes a certificate of a first KM server connected to the first server.

14. The method of claim 11, wherein the second authentication information includes at least one of a Sakai-Kasahara key encryption (SAKKE) public key and a server ID of a first KM server connected to the first server.

15. The method of claim 11, wherein the list includes IDs of a plurality of third terminals included in the adhoc group and connected to a second server.

16. The method of claim 15, wherein the list indicates a first ID of a terminal corresponding to the first authentication information among the plurality of third terminals and a second ID of a terminal not corresponding to the first authentication information among the plurality of third terminals.

17. The method of claim 16, further comprising:
transmitting, to a second KM server, a certificate request message requesting third authentication information related to the plurality of third terminals, the second KM server being connected to the second server based on the adhoc group communication request message;
receiving, from the second KM server, a certificate response message including the third authentication information in response to transmitting the certificate request message; and
performing an encryption and signing operation on the third authentication information based on the certificate response message,
wherein the adhoc group communication return message includes the third authentication information.

18. The method of claim 17, wherein the third authentication information includes a certificate of a third KM server connected to the second server.

19. The method of claim 17, wherein the third authentication information includes at least one of a SAKKE public key or a server ID of a third KM server connected to the second server.

20. The method of claim 17, wherein the encryption and signing operation is performed based on the first authentication information, the second authentication information, and the third authentication information, the secure communication is performed with the plurality of second terminals and the plurality of third terminals.

21. The method of claim 11, wherein the first authentication information is a first certificate of the first KM server.

22. The method of claim 11, wherein the first authentication information includes at least one of an elliptic curve-based certificateless signatures for identity-based encryption (ECCSI) public key or a server ID of the first KM server.

* * * * *